(12) United States Patent
Bieler et al.

(10) Patent No.: US 8,547,066 B2
(45) Date of Patent: Oct. 1, 2013

(54) METHOD AND APPARATUS FOR POWERING AN ELECTRIC HAND-HELD POWER TOOL DEVICE

(71) Applicant: Felco Motion SA, Les Geneveys-sur-Coffrane (CH)

(72) Inventors: Thierry Bieler, Echichens (CH); Laurent Cardoletti, Villeneuve (CH); Simon Tinguely, Chesopelloz (CH); Christian Koechli, Yvonnand (CH); Christian Fleury, Bellerive (CH)

(73) Assignee: Felco Motion SA, Les Geneveys-sur-Coffrane (CH)

( * ) Notice: Subject to any disclaimer, the term of this patent is extended or adjusted under 35 U.S.C. 154(b) by 0 days.

(21) Appl. No.: 13/829,486

(22) Filed: Mar. 14, 2013

(65) Prior Publication Data

US 2013/0200851 A1 Aug. 8, 2013

Related U.S. Application Data

(63) Continuation of application No. PCT/EP2011/069136, filed on Oct. 31, 2011.

(30) Foreign Application Priority Data

Nov. 3, 2010 (EP) ..................................... 10189856

(51) Int. Cl.
 *H02J 7/00* (2006.01)
(52) U.S. Cl.
 USPC ........... 320/126; 320/112; 320/114; 320/117; 320/121; 320/127
(58) Field of Classification Search
 USPC .......................................... 320/117, 121, 126
 See application file for complete search history.

(56) References Cited

U.S. PATENT DOCUMENTS

| | | | |
|---|---|---|---|
| 6,105,206 A | 8/2000 | Tokumaru et al. | |
| 7,589,492 B2 * | 9/2009 | Ooishi et al. | 320/104 |
| 7,592,773 B2 * | 9/2009 | Pellenc | 320/114 |
| 7,804,273 B2 * | 9/2010 | Popescu-Stanesti et al. | 320/108 |
| 8,089,247 B2 | 1/2012 | Pellenc | |
| 2001/0052758 A1 | 12/2001 | Odaohhara | |
| 2005/0275373 A1 * | 12/2005 | Guang et al. | 320/116 |
| 2006/0132086 A1 | 6/2006 | Altenburg et al. | |
| 2010/0097034 A1 | 4/2010 | Shu et al. | |

FOREIGN PATENT DOCUMENTS

| | | |
|---|---|---|
| EP | 0310717 B1 | 6/1993 |
| EP | 0920062 A1 | 6/1999 |
| EP | 1747710 A1 | 1/2007 |
| EP | 1747711 A1 | 1/2007 |
| FR | 2862558 A1 | 5/2005 |
| WO | WO-2009015960 A1 | 2/2009 |
| WO | WO-2009018535 A1 | 2/2009 |

* cited by examiner

*Primary Examiner* — Drew A Dunn
*Assistant Examiner* — Nathaniel Pelton
(74) *Attorney, Agent, or Firm* — Blank Rome LLP (57) ABSTRACT

An apparatus for powering an electric hand-held power tool device by an output voltage includes at least two connectors for connecting the apparatus to at least two batteries. At least two switches, and a command circuit of the switches, are provided. The command circuit is arranged for commanding the powering of the electric hand-held power tool device by using the battery which presents the highest open circuit voltage if the output voltage is higher than the open circuit voltage of each of the other batteries. And, by using the battery which presents the highest open circuit voltage and at least one other battery if the output voltage is lower than the open circuit voltage of the other battery, the battery which presents the highest open circuit voltage and the at least one other battery being connected in parallel.

13 Claims, 9 Drawing Sheets

METHOD AND APPARATUS FOR POWERING AN ELECTRIC HAND-HELD POWER TOOL DEVICE

The present application is a continuation of the international application PCT/EP2011/069136 (WO2012059470) filed Oct. 31, 2011, the content of which is included by reference, and which claims priority of the European patent application EP2451044 of Nov. 3, 2010, the content of all of which is hereby incorporated by reference.

FIELD OF THE INVENTION

The present invention concerns a method and an apparatus for powering an electric hand-held power tool device by using one or more batteries or packs of batteries according to the user's necessity, these batteries being connected in parallel.

DESCRIPTION OF RELATED ART

In this context the expression "electric hand-held power tool device" indicates any electric device or electrically powered tool device, i.e. a device which needs to be electrically powered with an autonomous power source and which during its use is held in the hand of a user. The power source can be for example a battery or a battery pack, and does not need to be hand-held; instead, it can be separated from the power tool device itself, e.g. the user holds the power tool device in his hand and wears its battery or battery pack on a harness or a backpack or a holding bell. "Power-tool device" implies the use of a motor or actuator for transmitting a force to an external part on which the device is acting. A laptop, a mobile phone or a computer, for example, are not power tool devices and do not fall in this definition.

Such an electric hand-held power tool device can be for example, but not limited to, a clippers, a drill, a riveting device, a pruning scissors, a saw, a fruit picking tool, a lawnmower, a bush cutter, a hedge cutter, a leaf blower, an impact spanner, a pneumatic hammer, an electric cutting device used for cutting cables or hoses or flexible pipes or metal sheets in an industrial domain. Such a device can be used also in a medical domain.

In this context the expression "battery" indicates preferably, but without limitation, a rechargeable battery, preferably a battery pack composed by one or several cells, e.g. Nimh, Nicd, Lion, Lipo, etc.

In the state of the art methods and apparatus for powering an electric hand-held power tool device according to the above definition by using only one battery are known.

FR2862558 (Pellenc) describes clippers powered by one lithium-ion or lithium-polymer electrochemical battery comprising at least four cells and an electronic driver.

U.S. Pat. No. 6,105,206 describes an electric portable leaf blower powered by a pack of battery wears by the user.

EP1747710 and EP1747711 describe electronic clippers powered by a battery pack fixed to the user's belt.

WO2009018535 describes a multiple battery configuration for an implantable medical device. This configuration does not allow hot replacement or insertion of a battery when more power is required.

The battery pack of the prior art for such an electric hand-held power tool device is usually integrated in a housing comprising an electronic driver which communicates with the power tool device and a circuit—named in the following "battery intelligence"—which manages and checks the state of charge (SOC) of the battery, and allows to avoid low and/or high voltage, to protect the battery against shortcuts and/or temperature variations and to balance the cells between them.

Using only one battery for powering such a electric hand-held power tool device however presents some drawbacks: first the battery weight worn by the user is of the order of magnitude of few kilos, which is hard to worn by a user using this power tool device continually for six or more hours, as in the case of pruning tool for pruning vines or orchards. Moreover the user cannot raise the power above the maximum available power, for example when he has to cut a branch bigger than usual branches. Finally, in the known solutions the electronic driver is integrated with the battery and its intelligence in a same box, in other words is not possible to change a battery without changing the electronic driver and to separate the battery intelligence from the electronic driver.

On the other hand, connecting at least two batteries or battery packs in parallel requires a protection circuitry to prevent uncontrolled loop currents when the open circuit voltages (OCV) of these at least two batteries are not equal, due to different battery state of charge. A conventional method uses a DC/DC converter, step up or step down, for connecting two or more battery packs in parallel to a set of capacitors. Such DC/DC converters can be unidirectional, i.e. only allowing batteries to provide power, or bidirectional, i.e. allowing batteries to be charged, e.g from a motor in a generating mode or from another battery. However connecting at least two batteries or battery packs in parallel by using DC/DC converters for adapting their voltage levels requires complex electronic circuitries, hardly suitable for powering the described electric hand-held power tool device.

US2006132086 describes an apparatus for power source selection comprising DC/DC voltage converters.

US2010097034 discloses a hierarchical battery-management system comprising a complex electronic circuitry: some intermediary modules are needed for coupling a monitoring and equalization module with a communication and decision module.

WO2009/015960 describes a current equalizer for equalizing charge currents in a battery group. The use of a memory buffer, i.e. an inductor or a capacitor element in this equalizer, constitutes a source of supplementary losses.

Therefore, a method and an apparatus for powering an electric hand-held power tool device which can use more than one battery are needed.

A method and an apparatus for powering an electric hand-held power tool device by using if necessary more than one battery and a circuitry simpler and having less losses than the known solutions are also needed.

A method and an apparatus allowing hot replacement and insertion of new batteries when more power is required are also needed.

BRIEF SUMMARY OF THE INVENTION

According to the invention, these aims are achieved by means of an apparatus for powering an electric hand-held power tool device according to claim 1, by means of a method for powering an electric hand-held power tool device according to claim 8 and by means of a computer-program product for causing an apparatus to power an electric hand-held power tool device according to claim 13.

Advantageously an apparatus according to the invention comprises at least two connectors for its connection to at least two batteries and at least two switches. A command circuit is arranged for commanding the powering of this electric hand-held power tool device by using only one battery, i.e. the battery which presents the highest open circuit voltage if the apparatus output voltage is higher than the open circuit voltage of each of the other batteries the previous battery and at least one other battery if the output voltage is lower than the open circuit voltage of this other battery, the at least two batteries being connected in parallel.

In other words the apparatus according to the invention allows a user which hand-holds an electric power tool device to power it with regards to his needs: for example if he needs more power for cutting a big branch, instead of using only one battery, he can plug a second battery in parallel to the first, regardless of the type of batteries and their state of charge.

Advantageously this solution allows to better partition the battery weight worn by the user, since he can wear only one battery if, for example he needs to cut only small branches.

According to the invention a battery intelligence is integrated in each battery. In other words the battery intelligence is separated from the main electronic board, comprising the electronic driver. Moreover it is possible to change a battery without changing the whole electronic driver.

The apparatus according to the invention manages the powering of the electric hand-held power tool device by using only one battery or two or more batteries in parallel in a way simpler than the known solutions, and without using DC/DC converters or memory elements generating supplementary losses.

Advantageously the apparatus according to the invention exploits the internal battery resistance for implementing a diode equivalent logic managed by a DSP, which can be integrated in the electronic driver, allowing to equilibrate batteries having a different technology and/or batteries having a different state of charge (SOC) without the need of a particular equilibrating electronics. In other words current loops between several battery packs in parallel having different open circuit voltages (OCV) are prevented: the power repartition between these packs is then almost ideal.

Advantageously the apparatus according to the invention allows a modular powering of the device, according to the user's needs. Moreover the apparatus is independent on the batteries' technology.

The invention relates also to a system comprising
the described apparatus,
at least two batteries
an electronic card
means for holding said at least two batteries and/or said electronic card
the electric hand-held power tool device
a connection between the electric hand-held power tool device and the apparatus and/or the electronic driver
means for allowing to wear the electric hand-held power tool device by a user.

Said means for wearing can be a harness or a backpack or a holding bell.

The apparatus can be integrated in the electronic driver.

The means for holding said at least two batteries can further hold said electronic driver.

The system can further comprise a user control module.

The system can further comprise means for connecting said at least two batteries to said electronic driver.

The system can further comprise means for indicating the average state of charge of said at least two batteries on said electric hand-held power tool device.

The system can further comprise for indicating the state of charge of each of said at least two batteries and other informations on the electronic driver and/or on said at least two batteries.

The means for holding can comprise mechanical and/or electrical plug connectors or cables and connectors.

The at least two batteries can comprise a battery intelligence and can have a different technology.

The system can further comprise a battery charger for charging and/or for checking and/or for diagnosing said at least two batteries.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1A:
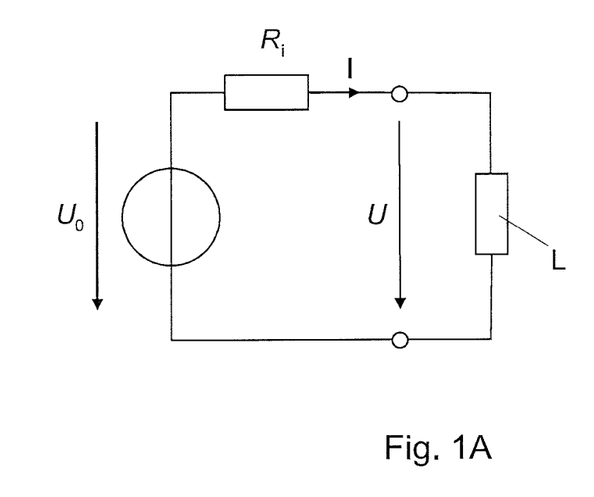
FIG. 1a shows an example of a modeling of a battery.

A battery or a battery pack can modeled as illustrated in FIG. 1a, i.e. as a DC voltage supply $U_0$ followed by an internal resistance $R_i$. $U_0$ corresponds to the open circuit voltage (OCV) which is equivalent to the battery voltage when the battery current is null. For example the OCV can correspond to about 30 V for an empty battery (state of charge SOC=0%) and to about 42 V for an fully charged battery (state of charge SOC=100%).

$R_i$ corresponds to the internal battery resistor. A typical value for a Li-Ion battery pack is 760 mΩ at 20° C. Internal resistance value increases at lower temperature. U corresponds to the battery output voltage including the voltage drop within the battery internal resistance.

The electrical power provided by a battery is equivalent to $$P_{dc} = U \cdot I = OCV \cdot I - R_i \cdot I^2 \qquad (1)$$

Figure 1B:
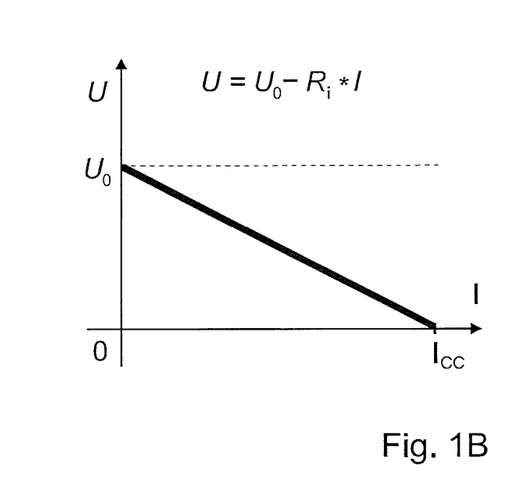
FIG. 1b shows the voltage-current relation for a battery.

FIG. 1b graphically shows the relation (1).

Figure 2:
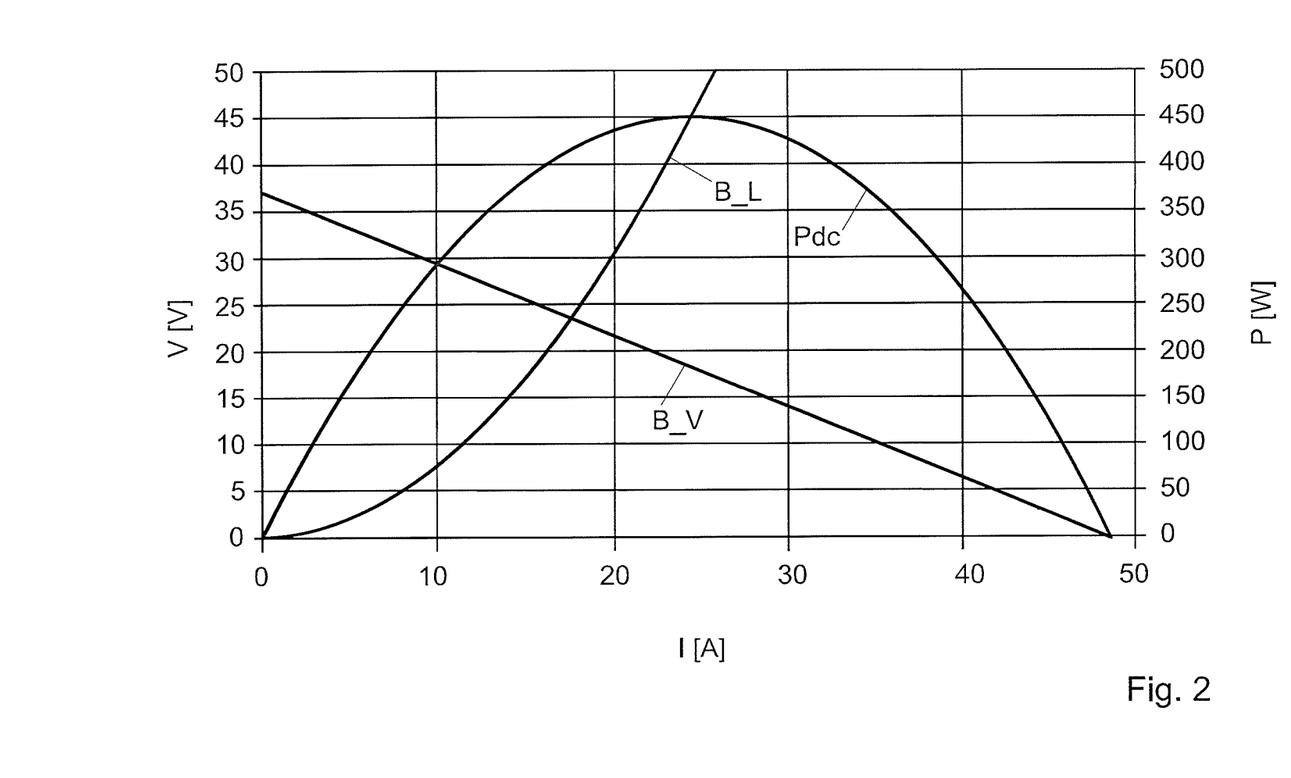
FIG. 2 shows an example of the battery voltage, the battery delivered power and the battery internal losses.

FIG. 2 shows an example of the battery voltage B_v, the battery delivered power Pdc and the battery internal losses B_1 for a battery according to the model of FIG. 1a. According to FIG. 2, max power is reached when the delivered power is equivalent to the battery internal losses, i.e. the battery losses are equal to $R_i \cdot I^2$.

Figure 3:
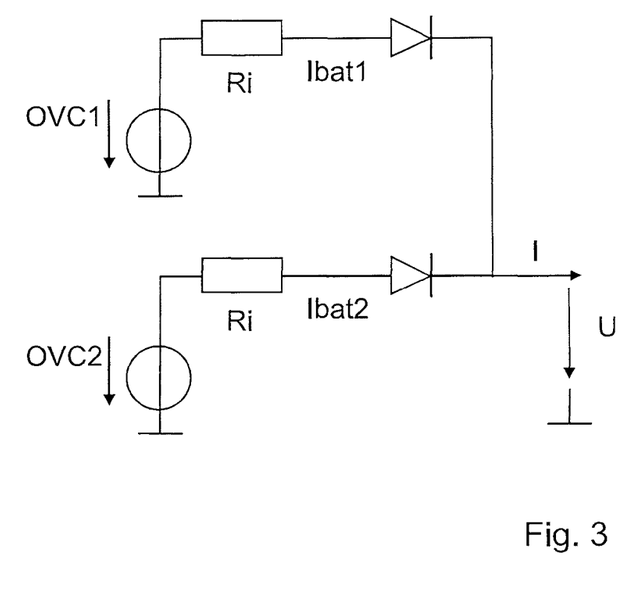
FIG. 3 shows an example of the implementation of a "diode equivalent logic".

Theory and practical tests have demonstrated that connecting two or more batteries in parallel through two diodes ideally suppress current loop from one battery to the others and allows an ideal power repartition between the batteries, as illustrated in FIG. 3.

If ideal diodes, i.e. diodes with no voltage drop in conduction, are used, the current provided by each of two batteries in parallel can be determined in function of the three voltage values, i.e., the output voltage U that is delivered to the load, the open circuit voltage of the first battery OCV1 and the open circuit voltage of the second battery OCV2 according to the following equations:

$$Ibatt1 = \begin{cases} 0 & \text{if } U \geq OCV1 \\ \dfrac{OCV1 - U}{R_i} & \text{if } U < OCV1 \end{cases} \quad (2)$$

$$Ibatt2 = \begin{cases} 0 & \text{if } U \geq OCV2 \\ \dfrac{OCV2 - U}{R_i} & \text{if } U < OCV2 \end{cases} \quad (3)$$

$$I = Ibatt1 + Ibatt2 \quad (4)$$

These basic equations (2) to (3) allow to theoretically calculate the current $Ibatt_1$, $Ibatt_2$ delivered by each battery as soon as their internal resistance and OCV values are known. Same considerations are still valid for more than two batteries in parallel.

Figure 4A:
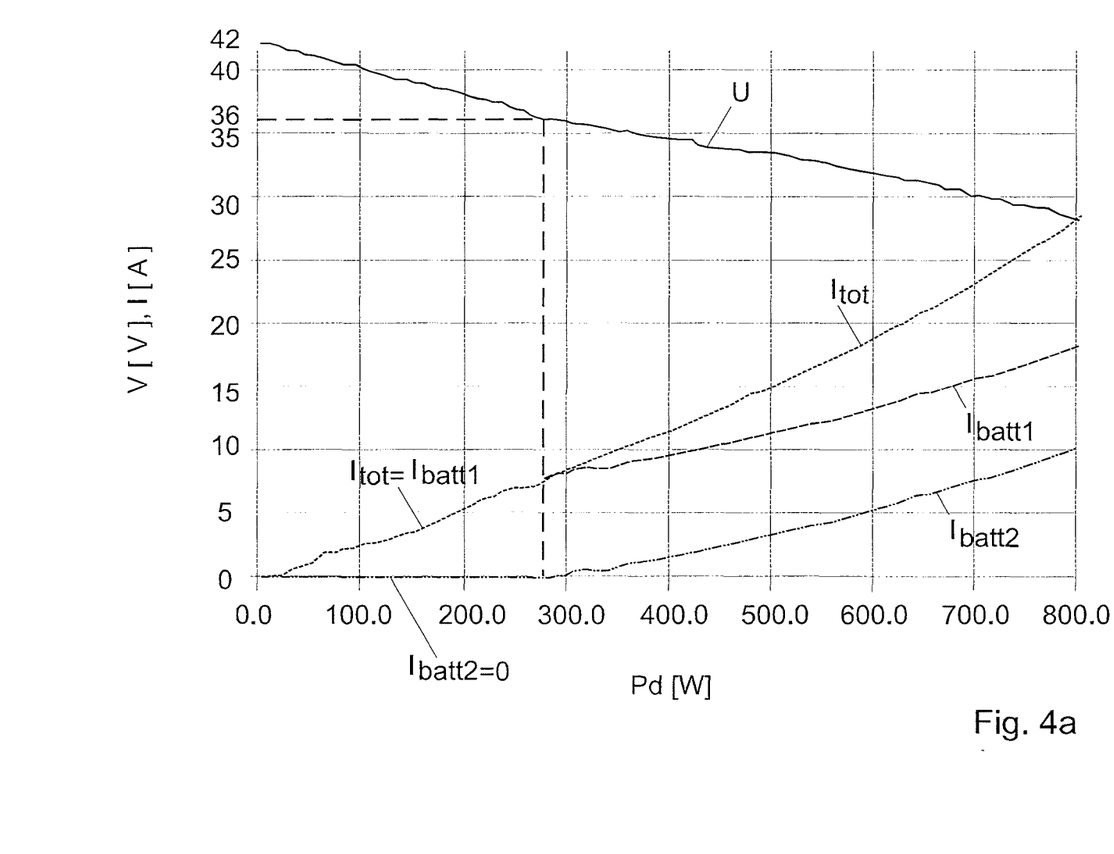
FIG. 4a shows an example of the current delivered by two batteries in parallel.
Figure 4B:
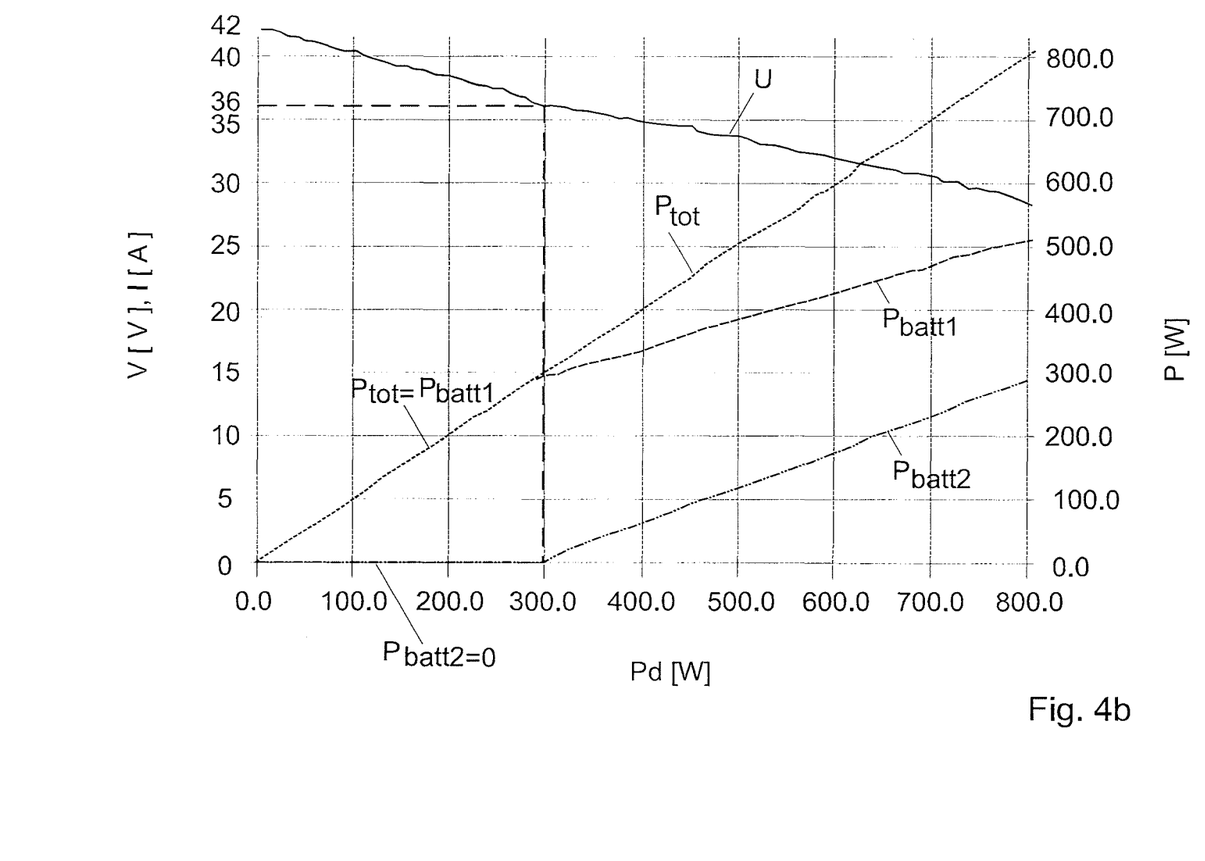
FIG. 4b shows an example of the power delivered by two batteries in parallel.

FIGS. 4a and 4b show an example of the current respectively the power delivered by two batteries in parallel through two diodes. In the illustrated example, the open voltage circuit OCV of the first battery, named battery 1, is 42 V, the OCV of the second battery, named battery 2, is 36 V, and the two batteries have a same technology, with an internal resistor having a resistance value $R_{i1}=R_{i2}=0.76\ \Omega$.

The battery 1, which presents the higher OCV, delivers alone the current/power while the voltage U is within the range 42 V to 36 V, i.e. OCV1=42V<U<OCV2=36V.

The battery 2, which presents the lower OCV, delivers part of the current/power only when the voltage U is lower than 36V, i.e. U<OCV2=36V. In other words, until the total delivered power is inferior to about 300 W in this example, corresponding to an output voltage U equal to OCV2, the total delivered current $I_{tot}$ is equal to the current Ibatt1 of the battery 1. When the total delivered power is superior to about 300 W, the total delivered current $I_{tot}$ is equal to sum of the currents Ibatt1 of the battery 1 and Ibatt2 of the battery 2. Same considerations are valid for the total delivered power $P_{tot}$ (FIG. 4b).

In other words the battery presenting the higher OCV can be used alone for the complete voltage range of the output voltage U; the battery presenting the lower OCV can be connected in parallel to the higher OCV battery as soon as its output voltage U is lower than the lower OCV voltage value.

The battery 1, i.e. the battery presenting the higher state of charge, then provides most of the application power which will tend to naturally equilibrate the batteries without the need of particular equilibrating electronics.

The man skilled in the art can extend these considerations to any positive integer number of batteries in parallel, said number being superior then two.

The two or more batteries in parallel can have different OCV or different state of charge (SOC) and can be realised with a different technology.

The equations (2) to (4) are proving that connecting two or more batteries or battery packs in parallel using diodes ideally prevents current loop between batteries with different OCVs and allows an ideal power repartition or equilibration between the batteries.

For implementing this "diode equivalent logic" and then offering the same power repartition between batteries it would be possible use simple diodes. However diodes present some losses related to the voltage drop across them and they cannot be commanded by a command circuit.

According to the invention diodes are replaced by switches, e.g. relays, transistors, thyristors, etc., which are controlled by a command circuit, e.g. hardware and/or software control logic simulating and/or approaching the "diode equivalent logic" presented above. Controlling the switches with different duty cycle would allow for example modifying the power repartition.

According to the invention diodes can be replaced by electronically improved diodes, i.e. diodes with additional electronics circuitry like controlled switches, e.g. relays, transistors, thyristors, etc. in parallel of the battery for reducing losses inside the diode when it is supposed to be conducting current.

Figure 5:
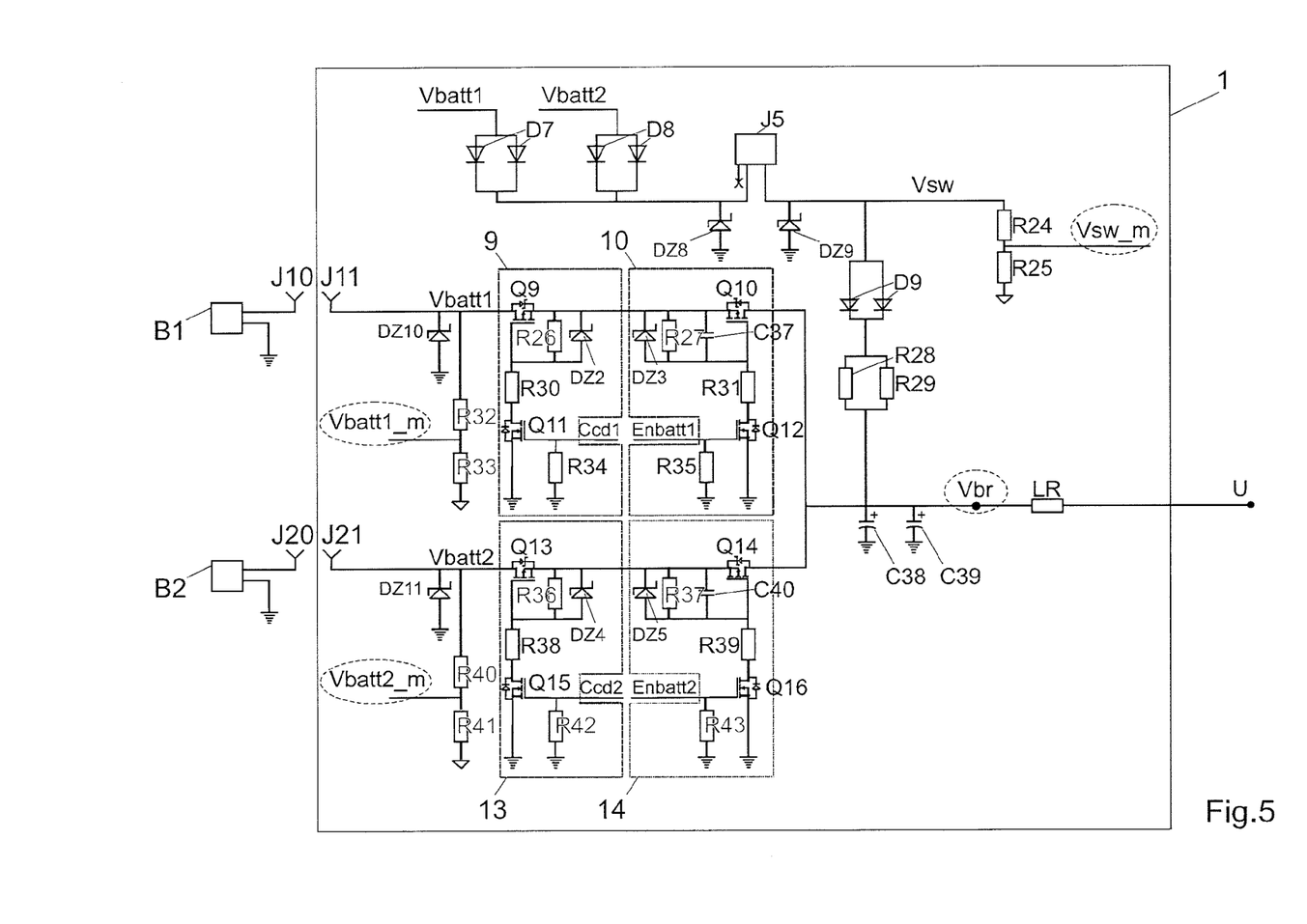
FIG. 5 shows a possible embodiment of the circuital implementation of the apparatus according to the invention.

FIG. 5 shows a possible embodiment of the apparatus 1 according to the invention. It allows to handle the connection of two batteries or battery packs in parallel. The man skilled in the art can apply the illustrated solution for a number of batteries or battery packs in parallel superior than two.

The illustrated apparatus allows to power an electric hand-held power tool device by an output voltage U which is related to the voltage Vbr across at least one of the two bride capacitors C38 and C39 through a linear relation LR. The apparatus according to the invention comprises two connectors J11, J21 for the connection to the connectors J10 respectively J20 of the two batteries B1, B2. It is supposed that the two batteries present a different OCV, for example OCV1>OCV2. The two batteries can be plugged to means for battery holding, e.g. a battery holder. A connector for the power tool device, not illustrated, allows to deliver the output voltage U.

As discussed, it could be possible to realise the switches 10, 14 according to the invention by simple diodes. However this simple solution cannot use a command circuit for their command. Moreover the voltage losses across the diodes could be not negligible and a bidirectional flow of current is not allowed. For these reasons the switches 10, 14 are realised by a transistor and some elements for commanding it, as illustrated in FIG. 5.

By using switch that can be commanded, the losses are inferior and it is possible to use a command circuit, not illustrated, arranged for commanding the powering of the electric hand-held power tool device according the illustrated "diode equivalent logic", i.e. by using
- the battery B1—which presents the highest open circuit voltage OCV1—if the output voltage U is higher than the open circuit voltage OCV2 of the battery B2
- the battery B1 and the battery B2 if the output voltage U is lower than the open circuit voltage OCV2 of the battery B2, the two batteries B1 and B2 being connected in parallel.

The command circuit can further comprise a Digital Signal Processing (DSP) circuit not illustrated. In another embodiment it comprises microprocessor or FPGA etc. In one preferred embodiment the DSP or the microprocessor or the FPGA can be integrated to an electronic driver 10, as will be discussed. Current and or voltage sensors, and analog-to-digital converters, are preferably used for delivering input signals to the command circuit, as will be described.

The apparatus in a preferred embodiment comprises two connecting switches 9, 13 arranged for allowing a unidirectional and/or bidirectional flow of current between the at least two switches 10, 14 and the at least two batteries B1, B2.

Each of the connecting switches 9, 13 comprises a transistor Q9 respectively Q13 having a diode in parallel, e.g. a P-channel MOSFET. This diode allows only a positive current according to the generator convention. Each of the switches 10, 14 in a preferred embodiment comprises a transistor Q10 respectively Q14, having a diode in parallel which can allow a negative current when Q9, respectively Q13, are ON.

The voltages Vbatt1 of the battery B1 and Vbatt2 of the battery B2 are also connected, through the diodes D7 and D8, which belong to a passive hot plug circuit discussed later, to a main switch J5, directly commanded by the user of the hand-held power tool device.

The apparatus of FIG. 5 allows to handle the following different states or configurations for the battery B1:

B1 not plugged to a battery holder.

B1 plugged and main switch J5 OFF and switch 10 OFF. In such a case J5 OFF means that the passive hot plug circuitry, composed by diodes D7, D8, D9 and by resistors R28 and R29, and which allows to precharge the apparatus, is not active and 10, i.e. transistor Q10, OFF allows to disconnect the battery B1.

B1 plugged and main switch J5 ON and switch 10 OFF. J5 ON means that the passive hot plug circuitry is active, i.e. the power bridge capacitors C38 and C39 are charged up to the battery 1 voltage Vbatt1 through the resistors R28 and R29. The resistance values of these resistors are high, in one embodiment equal to 2.2 k$\Omega$, for allowing to limit the current charging C38 and C39.

B1 plugged and main switch J5 ON and switch 100N and switch 9 OFF.

This configuration allows to connect the battery B1 through the diode of the transistor Q9. Switch 100N and switch 9 OFF means that the battery B1 only provides power, and there is no possibility to charge battery B1. In other words the current can be only delivered by B1 and can have only one direction, i.e. the positive direction according to the electrical generator convention.

B1 plugged and main switch J5 ON and switch 100N and switch 90N.

This configuration allows to connect the battery B1 through the transistor Q9. In this case the battery current direction can be bidirectional, in other words B1 can provide power or it is possible to charge B1.

Same considerations are valid for the battery B2, since the switches Q10 and Q14, Q9 and Q13 have equivalent functions.

Before connecting the batteries to the device through the switches 10 respectively 14, a passive hot plug procedure or pre-charging procedure is performed. According to this procedure the voltages of the two batteries Vbatt1 respectively Vbatt2 allow a current, limited by the diodes D7, D8 and D9 and the resistors R28 and R29, to charge at least one of the two power bridge capacitors C38, C39. The woken up DSP detects the voltage across these capacitors and connects the batteries B1, B2 battery to the device by acting on the switches 10 respectively 14. In fact the voltage Vbr across the power bridge capacitors C38 and C39 is measured for detecting if the passive hot plug procedure has been complete. Once completed, the batteries can be connected to the device.

The illustrated apparatus can be controlled by a control method performed by the mentioned command circuit. The command circuit uses following input signals which are measured at the following measurement's points:

Vsw_m: the voltage divider comprising the resistors R24 and R25 allows to measure the voltage Vsw_m for determining if the main switch J5 is ON or OFF.

Vbatt1_m: the voltage divider comprising the resistors R32 and R33 allows to measure the voltage of the battery B1 Vbatt1_m and to determine if B1 is connected as well as to check its state of charge by measuring its open circuit voltage while the motor of the hand-held power tool device is not running.

Vbatt2_m: the voltage divider comprising the resistors R40 and R41 allows to measure the voltage of the battery B2 Vbatt2_m and to determine if B2 is connected as well as to check its state of charge by measuring its open circuit voltage while the motor of the hand-held power tool device is not running.

Vbr: the voltage Vbr across the power bridge capacitors C38 and C39 is also measured for detecting if the passive hot plug procedure has been completed before to enable the batteries connected to the device.

Comparing different measurements can be performed by using a hardware comparator or by converting measurement's values into the digital domain and by using a software comparator.

The control method performs the following tasks when hot plug procedure is fully completed:

The battery or the batteries with an OCV corresponding to a battery not fully discharged are connected to the device or enabled by using the switch 10, i.e. the transistor Q10, for the battery B1 and the switch 14, i.e. the transistor Q14, for the battery B2.

While the motor of the hand-held power tool device is not running, i.e. while there is a low power consumption, the switches 10 and 14 are connected to the batteries B1 respectively B2 through the switches 9 respectively 13 by using the diode of transistor Q9 for the battery B1 and the diode of transistor Q13 for the battery B2. The OCV voltage of the connected batteries B1 and B2 is continuously measured by controlling Vbatt1_m and Vbatt2_m while the motor is not running.

While motor of the hand-held power tool device is running, i.e. while there is higher power consumption, the connection between the switches 10 and 14 and the batteries B1 respectively B2 through the switches 9 respectively 13 by using the diode of transistor Q9 for the battery B1 and the diode of transistor Q13 for the battery B2 could provide the needed power. In order to reduce the power losses within these connecting diodes, the battery presenting the higher OCV, in the considered example B1, can be connected through the transistor of the switches 9, i.e. the transistor Q9.

In order to reduce the power losses within the connecting diode of the battery presenting the lower OCV, i.e. B2, B2 can be connected through its transistor Q13 when the battery 2 voltage under load become lower or equal than the lower OCV (battery voltage=OCV–RI).

While motor is running and is generating power, e.g. it is in a braking state for decelerating the motor speed, switches 10 and 14 can be connected to the batteries B1 respectively B2 only through diodes of the switches 9 respectively 13, i.e. diode of transistor Q9 OFF for battery 1 and diode of transistor Q13 OFF for battery 2, in order to prevent the charging of the batteries.

For charging a battery, this battery can be connected through the transistor of the switches 9 respectively 13, i.e. the transistor Q9 for battery 1 or the transistor Q13 for battery 2 as soon as the voltage across the power bridge capacitors C38 and C39 becomes higher than the battery OCV.

In one embodiment it is possible to charge the battery presenting the higher OCV.

The functionalities implemented by the main switch J5 are:
Avoiding battery current loop and implementing a power repartition also on the precharge circuitry by connecting the battery packs to the device by using diodes D7 and D8.
When the switch J5 is set to the ON position, the DSP could be non alimented for a long time if C38 and C39 capacitors are totally empty. The precharge circuitry, through diode D9 and the resistors R28 and R29, allows to charge at limited current the capacitors C38 and C39 and to wake up the DSP in the electronic driver.
When the switch J5 is set to the OFF position, the electronic driver keeps to be supplied by the batteries through switches 9, 10, 13 and 14. Diodes D9 and the measurement of voltage Vsw_m allows the DSP to detect that the switch J5 has been switched OFF and perform an auto power off with a predefined timing. In one embodiment when the switch J5 is set to the OFF position, the electronic driver logic is no more supplied by the batteries and the system is forced OFF.

The control strategy described has to be considered as an example. Other approaches would allow achieving equivalent results. For example it is possible to avoid considering if a motor is rotating or not and only to consider the voltage value across the power bridge capacitors C38 and C39 compared to the battery packs OCV voltage values to drive controllable switches by using the "diode equivalent logic". Battery packs OCV voltage values can be measured when the electronic driver consumption is low, e.g. when Ibatt in the range of 50 mA.

The "diode equivalent logic" approach implemented with commanded switches for connecting two or more batteries or battery packs in parallel allows to power an electric hand-held power tool device, for example electric clippers. The batteries or battery packs can be connected to holding means, for example a battery holder, in function of user's needs: in other words the user can plug only one battery pack for reducing the weight worn, two or more battery packs connected to increase the autonomy and peak power available.

Each battery or battery pack is supposed to be built with protection and/or battery cells management and/or equilibrating circuitry, i.e. with a battery intelligence. The charge of the battery packs will be handled by an independent battery charger. In one embodiment the battery charger can check and diagnose the battery.

The system can comprise an electronic driver 10 which can be supplied by up to two battery packs in parallel regardless of the battery pack technology. The electronic driver 10 controls a hand-held power tool device 20 connected through a connection 30 providing N motor phase lines, where N=3 in the case of a brushless motor, N=4 in the case of a stepper motor, and N=2 for in the case of a DC motor. and one set of communication lines to interface hand-held power tool device user control, e.g. a finger control, some mode selection buttons, etc. In one embodiment more than one hand-held power tool device can communicate with a single electronic card by using these communication lines. The communication lines can be wired or wireless, e.g. IR, WiFi, Bluetooth, ZigBee, etc.

In a preferred embodiment, the hand-held power tool device 20 comprises a motor, for example a three-phases brushless motor, a two-phases stepper motor, a DC motor, and some user control interface. The user control interface includes a microcontroller allowing for example to read a finger control position, index sensor detecting key position and/or state of the device, etc. In another embodiment the hand-held power tool device comprises more than one motor and/or actuator.

Figure 7A:
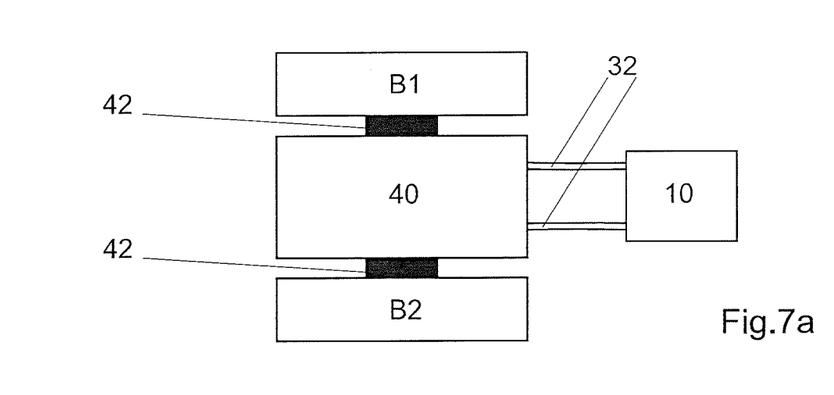
FIGS. 7a to 7b show two possible embodiments of the connection between at least two batteries and an electronic driver of the apparatus according to some embodiments of the invention.
Figure 7B:
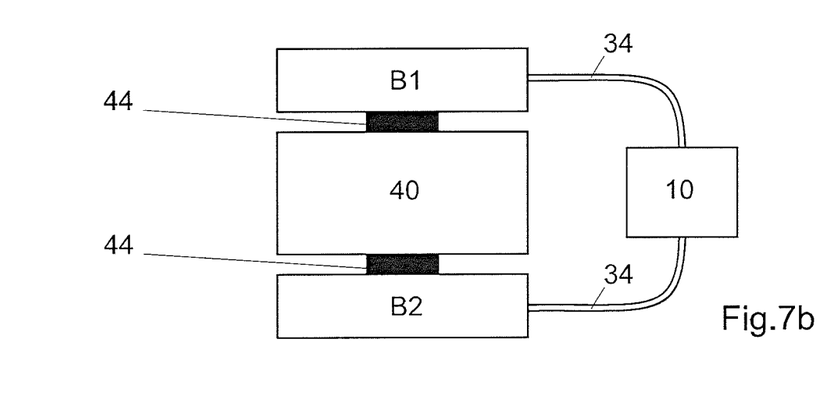

In one preferred embodiment, a cable per battery pack holder connects the battery packs B1, B2 to the electronic driver 10. In one embodiment, illustrated in FIG. 7a, mechanical and electrical plug connectors 42 connect each battery B1, B2 to a battery holder 40, which is connected electrically to the electronic driver through cables 32. In another embodiment, shown in FIG. 7b, the plug connectors 44 only allow a mechanical connection between batteries B1, B2 and the battery holder 40 and cables 34 electrically connect each of the battery B1, B2 to the electronic driver 10.

Figure 8:
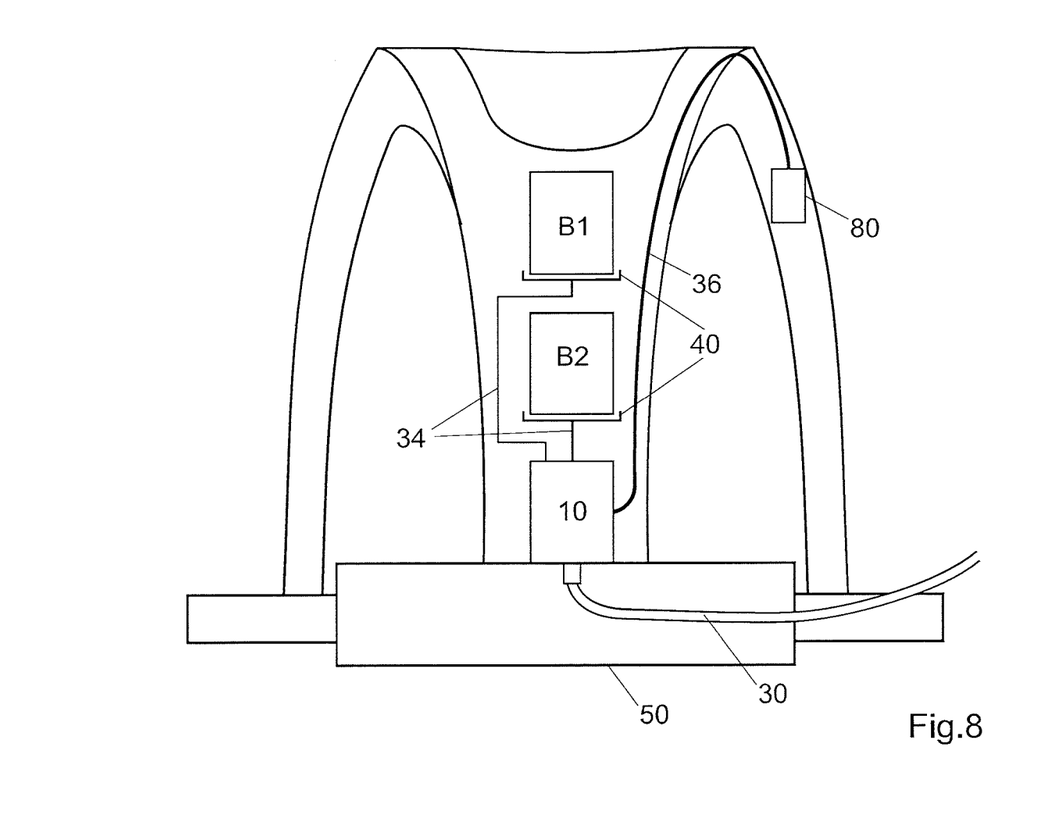
FIG. 8 shows an embodiment of the apparatus according to the invention, further comprising a user control module.

FIG. 8 illustrates the possibility to use an optional user control module 80 that could be placed at user disposal for additional user interface functionalities.

The main switch J5 can be placed in the electronic driver 10, in the optional user control module 80 or in the hand-held power tool device 20.

Figures 6A, 6B, 6C:
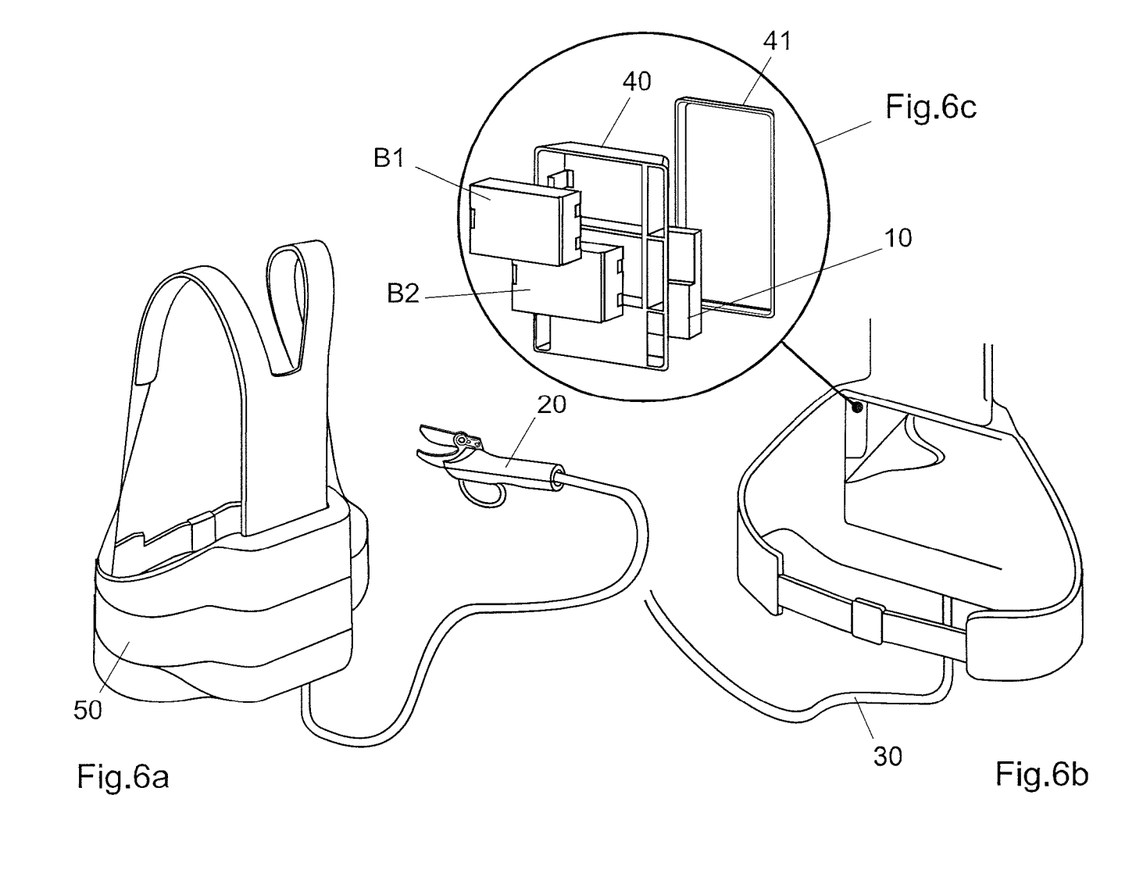
FIGS. 6a to 6b show a back and a front view, respectively, of an embodiment of the apparatus according to the invention.
FIG. 6c shows a detail of the FIG. 6b.

A wearing mean 50, e.g. a harness, a backpack or a holding belt can allow the user to hold the different described elements. as illustrated in FIGS. 6a, 6b and 8.

FIG. 6c illustrated a possible embodiment, in which the batteries are plugged on one side of a holder 40, which is connected on the other side to the electronic driver 10. A cover 41 protects the batteries and the electronic driver.

The communication lines used to interface the hand-held power tool device user control with the electronic driver can be designed by using Controller Area Network (CAN) serial communication physical layer in accordance with the ISO 11898 standard. A CAN transceiver provides transmit and receive capabilities between the differential CAN bus and a CAN controller, with signalling rates up to 1 Mbps, offering recessive dominant feature allowing to connect several user interface module on the same set of communication lines.

A dedicated protocol, for example a dedicated RS232 protocol, can be developed on this CAN hardware with a synchronisation byte and a CRC. A <<master/slave>> control strategy allows the electronic driver to interface several devices connected on the same set of communication lines, each peripheral responding to a different ID. The use of CAN with RS232 is easy to perform and allows resistant features.

This strategy opens possibilities to hold the hand-held power tool device with a mast and add a user control module in series between the electronic driver and the device. Presence detection of this additional control module can be performed by polling.

In one preferred embodiment the apparatus according to the invention is integrated in the electronic driver 10.

In another embodiment means, e.g. LEDs, indicate the average state of charge of the batteries B1, B2 on the electric hand-held power tool device 20. In another embodiment means, e.g. LEDs, indicate the state of charge of each of the batteries as well as other information on the electronic driver 10 and/or on the batteries B1, B2.

The batteries can be realised by using different technologies, e.g. Nimh, Nicd, Lion, Lipo, etc. In one preferred embodiment the weight of each battery is inferior to 700 g.

The voltage drop of each battery depends on its technology, i.e. its internal resistor, its SOC and its number of cells, if any.

The use of two or more batteries that can be connected or removed implies a "hot plug" management. It is then possible
  automatically remove the apparatus according to the invention if the batteries are not used for a long time (auto power-off)
  remove a discharged battery and continue to work with the others.

The invention claimed is:

1. An apparatus for powering an electric hand-held power tool device with an output voltage comprising
   at least two connectors for connecting said apparatus to at least two batteries
   at least two switches
   a command circuit of said switches, said command circuit being arranged for commanding said switches so as to power said electric hand-held power tool device by using
   the battery which presents the highest open circuit voltage if said output voltage is higher than the open circuit voltage of each of the other battery (ies);
   the battery which presents the highest open circuit voltage and at least one other battery if said output voltage is lower than the open circuit voltage of said other battery, said battery which presents the highest open circuit voltage and said at least one other battery being connected in parallel.

2. The apparatus of claim 1, further comprising at least two connecting switches arranged for allowing a unidirectional and/or bidirectional flow of current between said at least two switches and said at least two batteries.

3. The apparatus of claim 1, further comprising a main switch for activating/deactivating said apparatus.

4. The apparatus of claim 1, further comprising a passive hot plug circuit for pre-charging said device.

5. The apparatus of claim 1, said command circuit further comprising a DSP circuit.

6. The apparatus of claim 1, further comprising at least one power bridge capacitor.

7. The apparatus of claim 6, further comprising
   at least two measurement points for measuring the voltage of each of said at least two batteries
   a measurement point for measuring the voltage of said main switch
   a measurement point for measuring the voltage across said power bridge capacitor.

8. A method for powering an electric hand-held power tool device by an output voltage of an apparatus, comprising
   connecting said apparatus to at least two batteries by using at least two connectors
   commanding at least two switches so as to power said electric hand-held power tool device by using
   the battery which presents the highest open circuit voltage if said output voltage is higher than the open circuit voltage of each of the other battery (ies);
   the battery which presents the highest open circuit voltage and at least one other battery if said output voltage is lower than the open circuit voltage of said other battery, said battery which presents the highest open circuit voltage and said at least one other battery being connected in parallel.

9. The method of claim 8, further comprising allowing a unidirectional and/or bidirectional flow of current between said at least two switches and said at least two batteries by using at least two connecting switches.

10. The method of claim 8, further comprising activating/deactivating said apparatus by using a main switch.

11. The method of claim 8, further comprising a passive hot plug procedure for pre-charging said device.

12. The method of claim 10, further comprising checking
    at least two measurement points for measuring the voltage of each of said at least two batteries
    a measurement point for measuring the voltage of said main switch
    a measurement point for measuring the voltage of a power bridge capacitor.

13. A computer-program product for causing an apparatus to power an electric hand-held power tool device by an output voltage comprising instructions executable to
    command at least two switches for powering said electric hand-held power tool device by using
    a battery which presents the highest open circuit voltage if said output voltage is higher than the open circuit voltage of each of the other batteries
    the battery which presents the highest open circuit voltage and at least one other battery if the said output voltage is lower than the open circuit voltage of said other battery, said battery which presents the highest open circuit voltage and said at least one other battery being connected in parallel.

* * * * *